US007416239B2

(12) United States Patent
Lanser et al.

(10) Patent No.: US 7,416,239 B2
(45) Date of Patent: Aug. 26, 2008

(54) FOAM CORE VISOR

(75) Inventors: Michael L. Lanser, Holland, MI (US); Steven T. Dyk, Holland, MI (US); David L. Hiemstra, Hudsonville, MI (US)

(73) Assignee: Innotec Corporation, Zeeland, MI (US)

( * ) Notice: Subject to any disclaimer, the term of this patent is extended or adjusted under 35 U.S.C. 154(b) by 0 days.

(21) Appl. No.: 11/029,590

(22) Filed: Jan. 5, 2005

(65) Prior Publication Data

US 2006/0145508 A1 Jul. 6, 2006

(51) Int. Cl.
*B60J 3/00* (2006.01)

(52) U.S. Cl. .................................................... 296/97.1

(58) Field of Classification Search ................. 296/97.1
See application file for complete search history.

(56) References Cited

U.S. PATENT DOCUMENTS

| | | | | |
|---|---|---|---|---|
| 1,963,393 | A | 6/1934 | Woodall | |
| 3,610,680 | A | 10/1971 | Brady | |
| 4,163,579 | A | 8/1979 | Mahler et al. | |
| 4,458,938 | A * | 7/1984 | Viertel et al. | 296/97.1 |
| 4,570,990 | A | 2/1986 | Flowerday | |
| 4,626,019 | A | 12/1986 | Tung et al. | |
| 4,952,008 | A | 8/1990 | Lobanoff et al. | |
| 5,007,532 | A | 4/1991 | Binish | |
| 5,031,951 | A * | 7/1991 | Binish | 296/97.1 |
| 5,295,725 | A * | 3/1994 | Jones | 296/97.1 |
| 5,308,137 | A | 5/1994 | Viertel et al. | |
| 5,318,336 | A | 6/1994 | Aymerich et al. | |
| 5,411,309 | A | 5/1995 | Aymerich et al. | |
| 5,678,879 | A * | 10/1997 | Mailander et al. | 296/97.1 |
| 5,779,298 | A | 7/1998 | Smelser et al. | |
| 5,860,690 | A | 1/1999 | Dellinger et al. | |
| 5,947,545 | A * | 9/1999 | Akagi et al. | 296/97.5 |
| 6,192,966 | B1 | 2/2001 | Yang | |
| 6,289,968 | B1 | 9/2001 | Karten et al. | |
| 7,192,075 | B1 * | 3/2007 | Asai | 296/97.1 |

FOREIGN PATENT DOCUMENTS

| | | |
|---|---|---|
| GB | 209841 A | 12/1982 |
| JP | 63090428 | 4/1988 |

OTHER PUBLICATIONS

Federal Motor Vehicle Safety Standards;Head Impact Protection, Federal Register, Aug. 28, 2000.*

Department of Transportation, NHSTA, Federal Motor Vehicle Safety Standards; Head Impact Protection, pp. 1-3 of 39.*

* cited by examiner

*Primary Examiner*—Dennis H Pedder
(74) *Attorney, Agent, or Firm*—Price, Heneveld, Cooper, Dewitt & Litton, LLP

(57) ABSTRACT

A visor for vehicles includes a shell made of a material such as paper, vinyl, or the like. The visor includes first and second halves joined by a hinge. The first and second halves are folded about the hinge and bonded together to define a cavity. A rigid foam core fills at least a substantial portion of the cavity, and the foam core is bonded to the shell to provide support. The visor includes a structural mounting member extending from the shell for mounting the visor to the roof of a vehicle.

24 Claims, 8 Drawing Sheets

21A
21B
23
16
20B
20A
22
21
18
19
13
17
9
4A
4B
3A
11A
24
11B
3B 1
2
3
4B
10B
3B
2B
12
14
16
III
10A
11A
3A
2A
4A
5
6
7
8
13
15
II
9
17
18
19
20A
20B
21
21A
21B
22
23
24
11B 32
35
41
36
37
33
(102)
34
30
(102)
31
103
103

90
93
92
91

80
86
84
85
82B
83B
81B
81
83A
81A
82A
82

80
IX
IX
14

100
102
103
101

FOAM CORE VISOR

BACKGROUND OF THE INVENTION

Various sun visors for motor vehicles and the like have been developed. Such sun visors typically have a "butterfly" core that is molded of a polymer material and includes a living hinge along a centerline of the visor core. During fabrication, the two halves of the visor core are folded about the hinge, and may be covered with a layer of padding material and an outer covering of fabric, vinyl, or leather to form the visor. Known visors typically include an elbow to mount the visor to a vehicle roof, and also may include a detent spring that acts on the elbow to provide rotational control of the position of the visor.

SUMMARY OF THE INVENTION

One aspect of the present invention is a visor for vehicles, the visor including a shell made of a material such as vinyl or paper and having first and second halves joined by a hinge. The first and second halves have shallow concave shapes and define perimeters. The first and second halves are folded about the hinge and bonded together along at least a substantial portion of the perimeters to define a cavity. The visor includes a structural mounting member extending from the shell for mounting the visor to the roof of a vehicle. A rigid foam core fills at least a substantial portion of the cavity, and the foam core is bonded to the shell to provide structural support. A cover made of a thin material extends over the shell.

Another aspect of the present invention is a method of making a visor core. The method includes positioning a sheet of paper adjacent a first cavity in a tool, the cavity having a shape corresponding to the outer surface of a first half of a visor core. Uncured flowable foam is introduced against a side of the sheet opposite the first cavity to deform the sheet of paper into the first cavity. Paper is also positioned adjacent a second cavity in a tool having a shape corresponding to the outer surface of a second half of a visor core. Uncured flowable foam is introduced against a side of the sheet opposite the second cavity to deform the paper into the second cavity. Excess paper is trimmed from around the foam to form first and second visor core halves. The foam is cured to form generally rigid first and second foam cores. The first and second visor core halves are fixed together to form a visor core having a paper shell and a foam core.

Yet another aspect of the present invention is a method of forming a visor core part having a paper shell and a foam core. The method includes providing an elongated sheet of paper, and positioning a first portion of the sheet of paper over a cavity at a forming station. The cavity defines a perimeter and has a shape corresponding to at least a portion of the outer surface of the visor core part to be made. Flowable foam is introduced against the first portion of the paper to push the paper into the cavity. The foam is cured to form a substantially rigid first foam core. Excess paper is trimmed from around a portion of the perimeter of the cavity. The sheet of paper is advanced to a position wherein a second portion of the sheet of paper is at the forming station. Flowable foam is introduced against the second portion of the paper to push the second portion of the paper into the cavity. The foam is cured to form a substantially rigid second foam core. Excess paper is trimmed from around a portion of the perimeter, and the paper is cut to form at least one paper link interconnecting the first and second foam cores.

These and other features, advantages, and objects of the present invention will be further understood and appreciated by those skilled in the art by reference to the following specification, claims, and appended drawings.

BRIEF DESCRIPTION OF THE DRAWINGS

FIG. 8;

DETAILED DESCRIPTION OF PREFERRED EMBODIMENT

Figures 1, 2, 3:
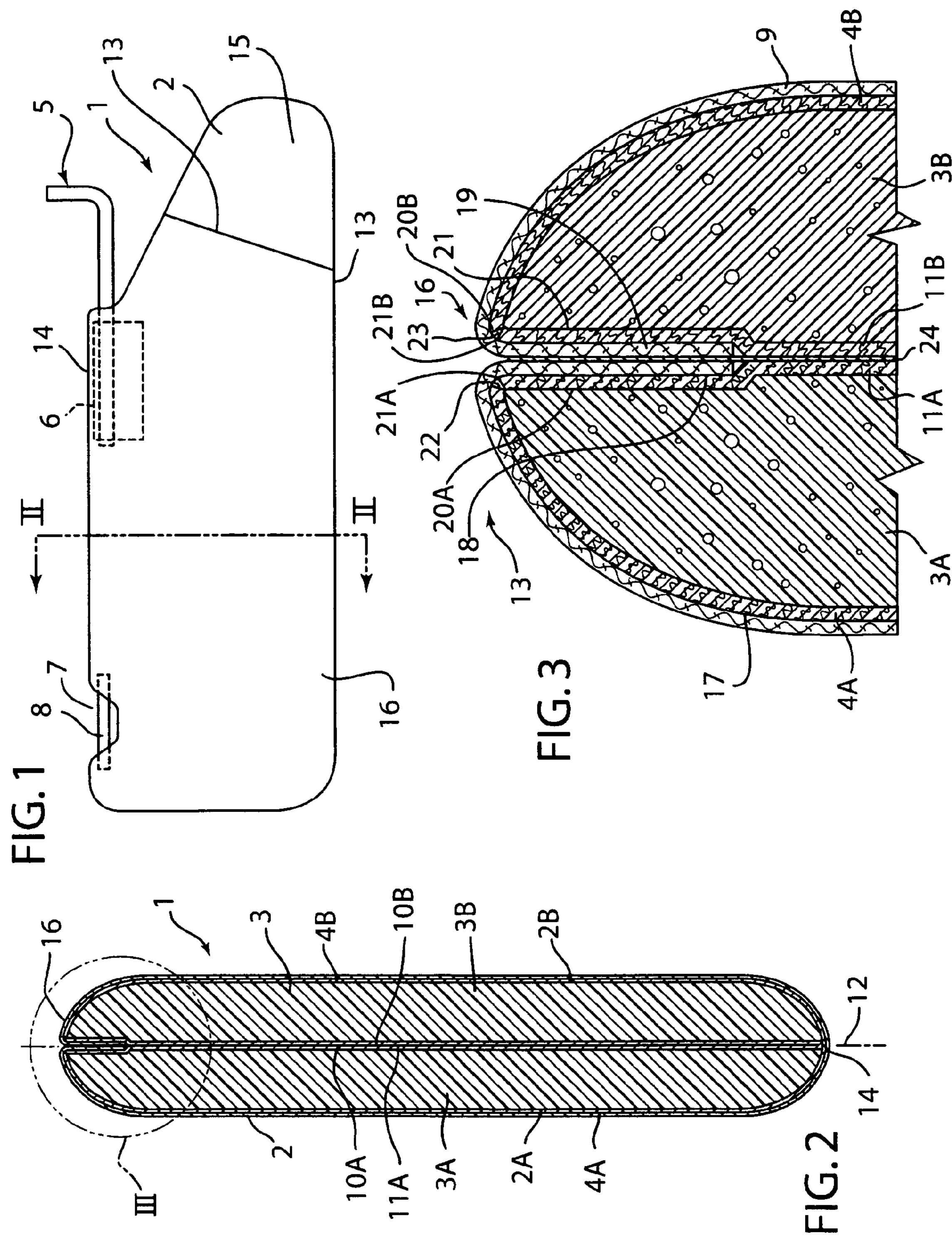
FIG. 1 illustrates a visor according to one aspect of the present invention.
FIG. 2 is a cross-sectional view of the visor of FIG. 1 taken along the line II-II.
FIG. 3 is a fragmentary, enlarged view of a portion of the visor of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a visor 1 according to one aspect of the present invention includes a visor core 2 having a foam core 3 and a paper shell 4 (see also FIG. 2). A structural mounting member such as an elbow 5 is provided for mounting the visor 1 to the roof of a motor vehicle or the like. Elbow 5 is operably coupled to a detent spring 6 to control rotation of the visor core 2 relative to the elbow 5 in a known manner. Elbow 5 may include a linear slide to permit sliding of visor core 2 along elbow 5. The visor core 2 may include a recess 7 across which a support pin 8 extends. The support pin 8 retains the visor in the stored position during use in a known manner. Visor 1 may include an "ear" 15 that is flexibly attached to main portion 16 via one or more hinge lines 13.

As illustrated in FIG. 2, the visor core includes a first half 2A formed by a first half 3A of foam core 3 and a second half 2B formed by foam core half 3B. Foam core halves 3A, 3B include flat surfaces 10A and 10B to which layers of paper 11A, 11B, respectively, are adhered. A central plane 12 through a central portion of the visor core 2 is defined by the contact between paper layers 11A and 11B. As described in more detail below, the visor core 2 is fabricated in two halves with a first sheet of paper 4 includes a first half 4A and second half 4B extending around the outside of the foam core halves 3A, 3B and interconnecting the two halves to form a "living hinge" 14 between the core halves 2A and 2B. A second sheet of paper 11 is folded onto itself at 14, with the two halves 11A and 11B of sheet 11 abutting surfaces 10A, 10B, respectively of contacting each other to define central plane 12 at the plane of contact between paper layers 11A and 11B.

With further reference to FIG. 3, a sheet of cover material 9 extends over the paper 4. The cover material 9 may be a fabric material, a woven fabric material, a polymer material, or a naturally-occurring material such as leather, depending upon the requirements for a particular application. Edges 18 and 19 of cover 9 wrap around corners 22 and 23 of foam core halves 3A and 3B, respectively. Edges 20A, 20B of paper halves 4A, 4B, respectively terminate at corners 22, 23 of foam core halves 3A, 3B, respectively. Edges 21A, 21B of paper sheet halves 11A, 11B also terminate at corners 22, 23 and extend adjacent, abut, and/or overlap edges 20A and 20B. Adhesive 24 is disposed between layers of paper 11A and 11B to bond the visor core halves 2A and 2B together. Adhesive 24 may also extend around the perimeter 13 and adhesively bond the edges 18 and 19 of cover material together, and/or the edges 20 and 21 of the paper shell 4. Significantly, because the cover material 9 wraps around the corners 22 and 23, it forms a tucked edge having a very smooth and uncluttered appearance. Furthermore, the adhesive 24 provides a very secure bond between the visor core halves 2A and 2B, thereby providing a very rigid, lightweight, yet durable structure. If the cover material 9 is fabric, the cover material 9 can typically be secured utilizing adhesive at edges 18 and 19, with the cover material 9 placed in tension to provide a smooth cover. If the cover material is vinyl, leather, or other material having relatively low stretch, the cover material may be adhesively bonded to substantially the entire outer surface 17 of the paper shell 4. Because vinyl, leather, or other cover materials may have a different coefficient of thermal expansion than the foam core 3, such materials may separate from surface 17 of foam core 3 and sag or develop wrinkles or the like if not adhesively bonded to outer surface 17 of paper shell 4.

Figure 4:
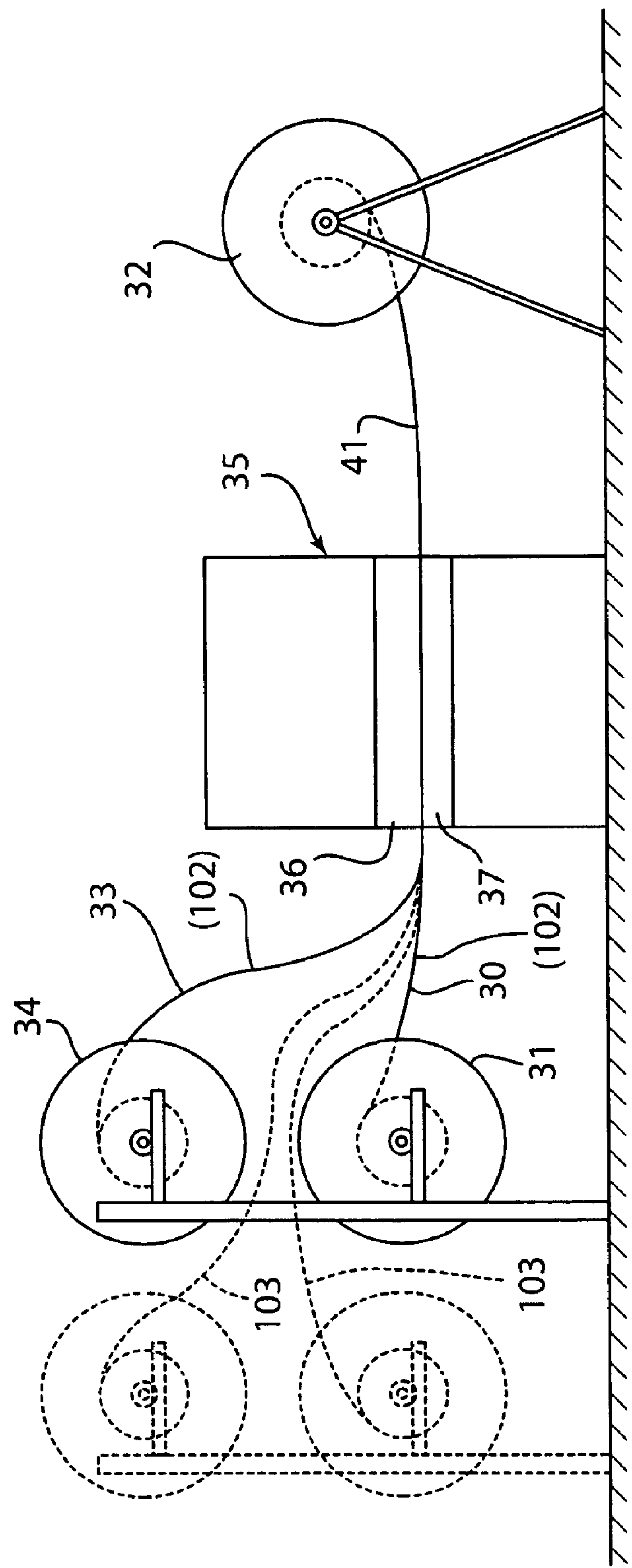
FIG. 4 is a partially schematic elevational view illustrating tooling for fabricating visor cores according to another aspect of the present invention.
Figure 5:
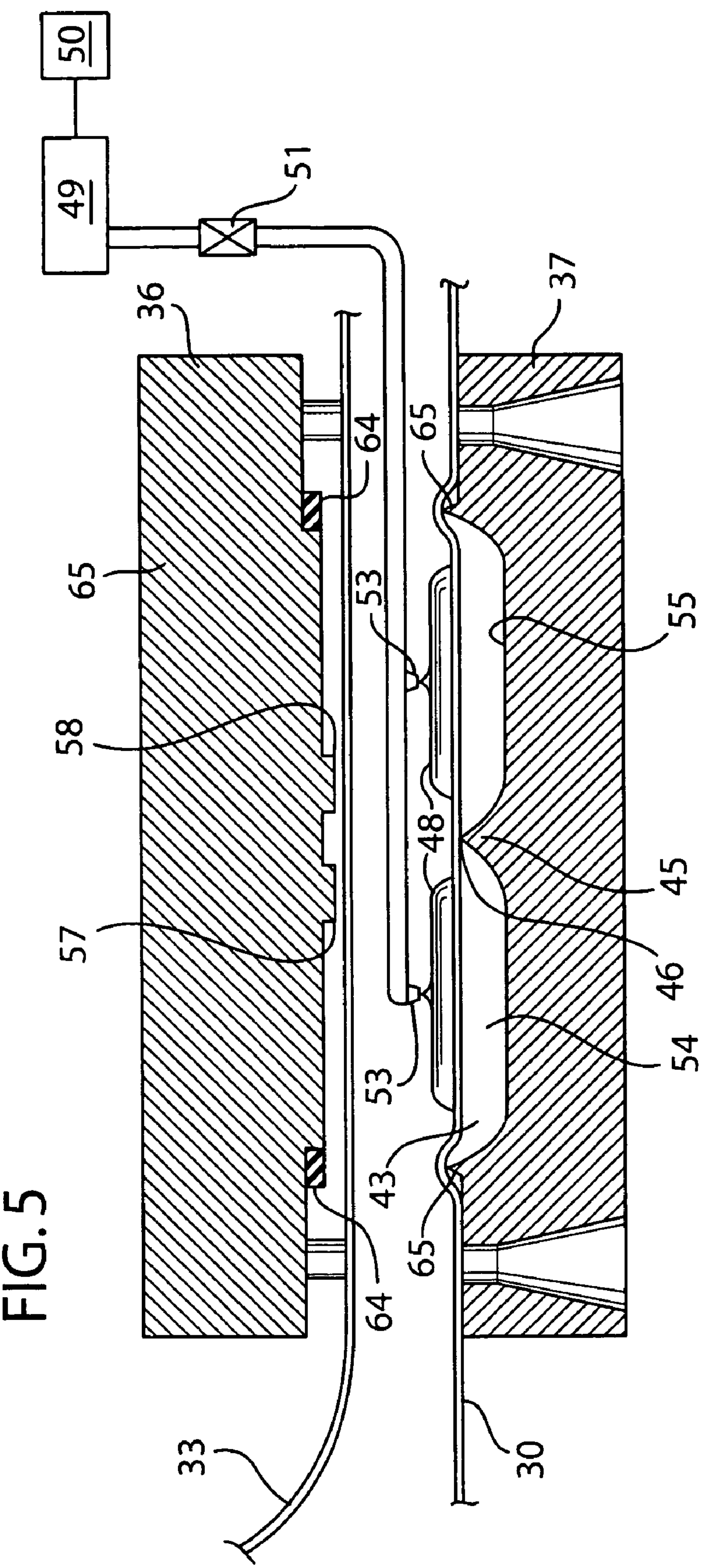
FIG. 5 is a partially schematic view of the tooling of FIG. 4.

With reference to FIG. 4, during fabrication of the visor 1, elongated sheets of paper material 30 and 33 fed from rolls 31 and 34 into a tool 35. As described in more detail below, tool 35 injects the foam to form the cores 3A and 3B, and also trims excess paper from around the foam cores 3A and 3B. As also described in more detail below, the visor cores are interconnected by paper links 40 (see also FIG. 7) to form a chain 41 of visor cores that may be wound on a second roll 32. Tool 35 includes an upper part 36 that can be pivoted or otherwise moved vertically relative to a lower part 37 via a number of known mechanisms (not shown). As illustrated in FIG. 5, a first sheet of paper 30 is positioned in the tool 35 over a first cavity 43 and a second cavity 44. First cavity 43 has a contour corresponding to the outer surface of the first visor core half 2A, and cavity 44 has a contour corresponding to the second visor core half 2B. A dividing wall or portion 45 extends between the cavities 43 and 44, and includes a relatively sharp edge 46 that form the hinge 14 about which the core halves 2A and 2B are folded during fabrication. A divider wall 45 may also extend across mold cavities 43 and 44 to form one or more hinges 13 (FIG. 1) to form an ear 15 that is flexibly connected to main portion 16 of visor core 2. As also discussed in more detail below in connection with FIG. 11, sheets of vinyl material 102 and sheets of fiberglass scrim 103 may be utilized to form a visor core or other component according to another aspect of the present invention.

Figure 6:
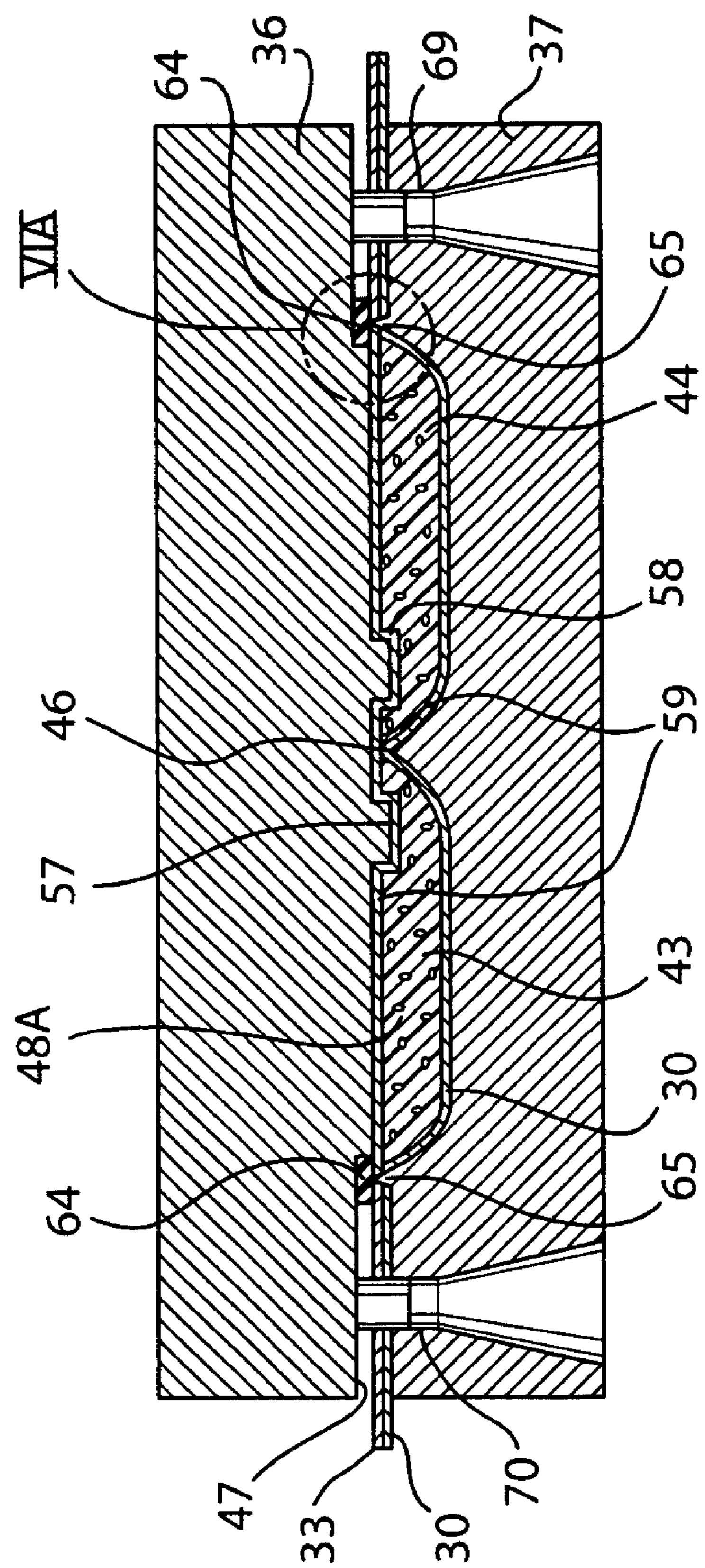
FIG. 6 is a schematic view of the tooling of FIG. 5 showing foam introduced in the cavities.

After the sheet of paper 30 is positioned in the tool 35, uncured liquid foam 48 is injected onto the portions of paper 30 above cavities 43 and 44 via a foam supply source 49 of a known design. The uncured foam 48 may be a 2-part polyurethane foam or other suitable foam material that is injected onto paper 30 in a liquid form immediately after the 2 parts of the foam are mixed. A controller 50 is operably coupled to the supply 49 and one or more valves 51 to control the foam as it flows from nozzles 53 onto paper 30. A second sheet of paper 33 is then positioned over paper sheet 30 and liquid foam 48. Upper tool part 36 is then rotated or translated to the lower position illustrated in FIG. 6. Due to the pressure of the foam 48, paper sheet 30 is pushed outwardly against the walls 54 and 55 of cavities 43 and 44, respectively. The paper 30 thereby takes on a shape corresponding to the desired final, outer surface of the visor core 2. As the foam 48 cures, it soaks into the paper 30 and 33, and thereby forms a strong bond with the paper, forming a lightweight, yet stiff structure. Extensions 57 and 58 extend into cavities 43 and 44, and form cavities 61 and 62 (see also FIG. 7) for receiving the elbow 5 and detent spring 6. One or more protrusions may also be utilized to form cavities 63 that are utilized to secure the support pin 8 to the visor cores 2. Flat surface 59 of upper tool part 36 forms the flat surfaces 10A and 10B of foam core halves 3A and 3B, respectively, and also keeps paper 33 flat. As described in more detail below, punches 69 and 70 may be utilized to punch holes 71 in links 40 that interconnect adjacent visor cores to form chain 41.

Figure 6A:
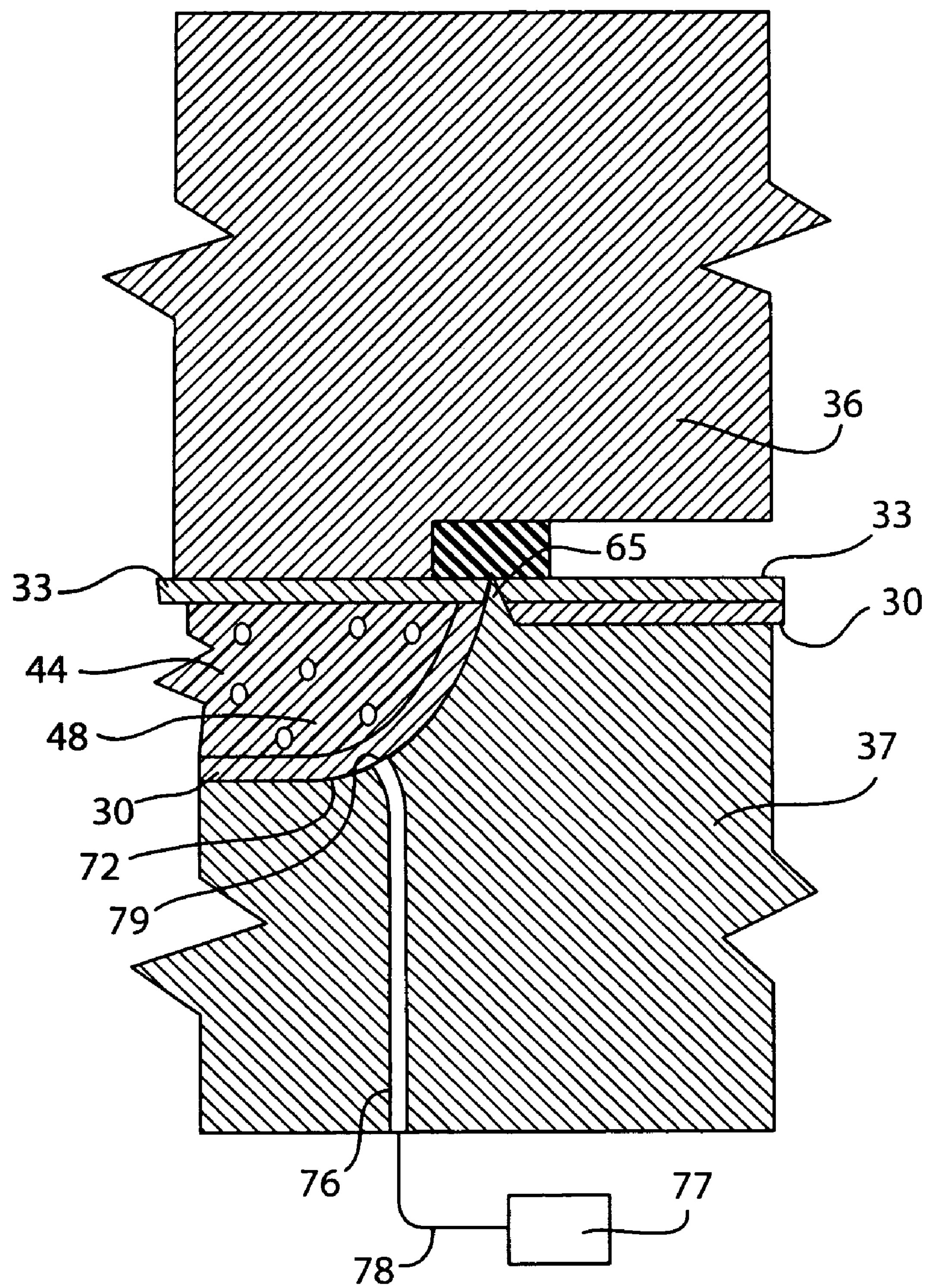
FIG. 6A is a partially schematic enlarged cross-sectional view of a portion of the tool of FIG. 6.

With further reference to FIG. 6A, lower tool part 37 includes blades or edges 65 that extend around the perimeters 66 of cavities 43 and 44. The blades 65 protrude upwardly from lower tool part 47, and cut into a urethane strip 64 fixed to upper tool 36. The blades 65 seal the cavities 43 and 44 to prevent leakage of the foam 48, and also cut the paper sheets 30, 33 around the cavities 43 and 44 at corners 22, 23 (FIG. 3) of foam core halves 3A, 3B. It will be appreciated that the size of blades 65 and urethane strip 64 are exaggerated somewhat in FIGS. 5-6A for purposes of illustration.

As illustrated in FIG. 6A, one or more vacuum ports 76 may be provided in lower tool part 37. Vacuum ports 76 are connected to a vacuum pump 77 via a line 78. Vacuum pump 77 may be operably connected to controller 50. Corners 72 or other areas within cavities 43 and/or 44 of parts having complex shapes and/or corners or the like having a small radius may not fill completely with foam 48, such that the paper 30 does not press completely against walls 54 and/or 55 of mold part 37, resulting in voids. Inlets 79 of vacuum ports 76 may be positioned at corners 72 or other locations as required. Ports 76 provide a vacuum that pulls the paper 30 against the sidewalls 54 and/or 55 of mold part 37 to prevent formation of voids.

Figure 7:
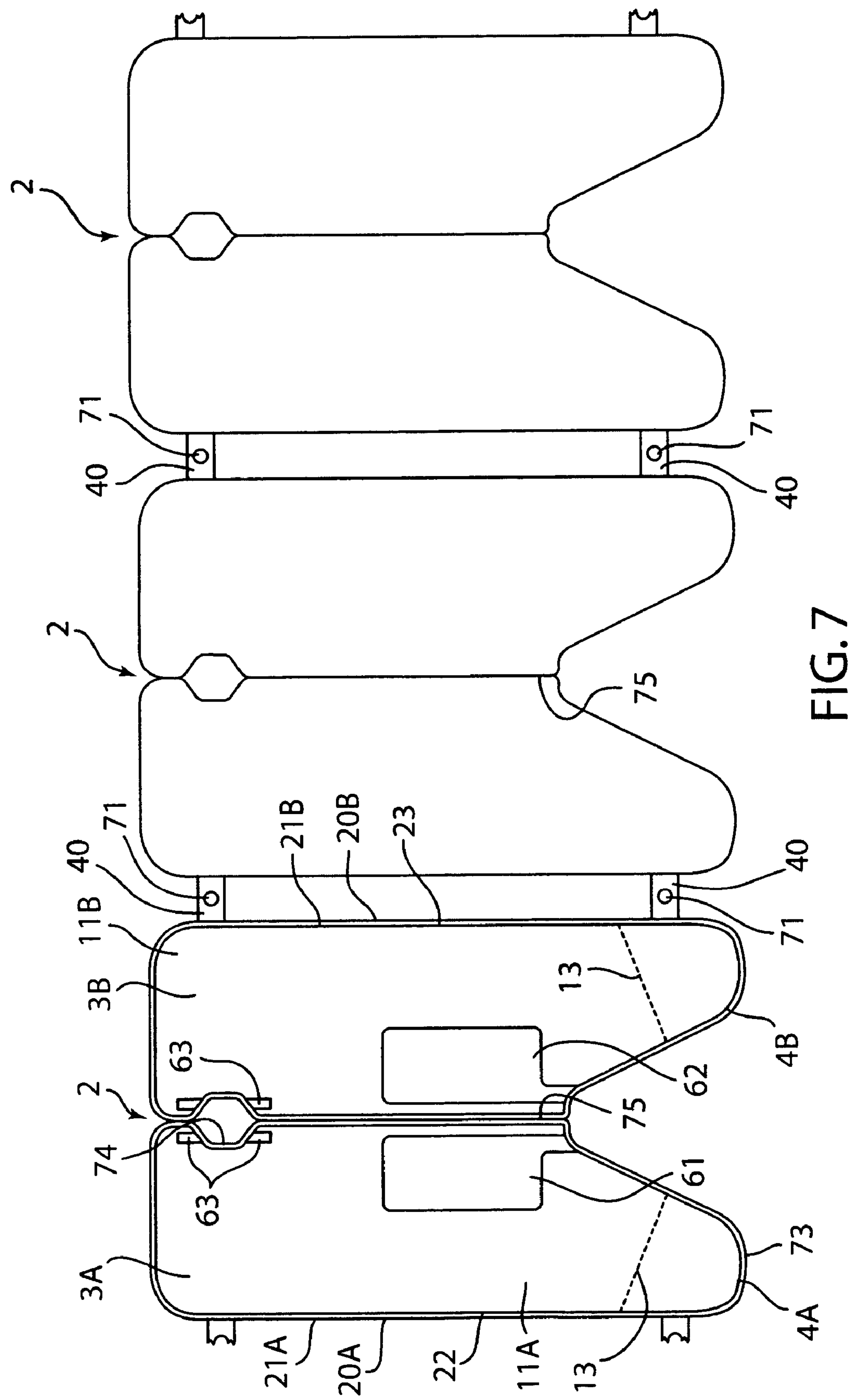
FIG. 7 is a view of a plurality of visor cores that are interconnected by links formed from a paper sheet.

With reference to FIG. 7, the blades 65 are configured to trim the paper to form a perimeter 73 extending around the foam core halves 3A and 3B. Because blades 65 cut paper sheets 30 and 33 at the perimeter of the cavities 43 and 44, the edges 20A and 21A of papers 4A and 11A, respectively, the edges 20B and 21B of papers 4B and 11B, respectively, and the corners (edges) 22 and 23 of foam core halves 3A and 3B all terminate at perimeter 73. Also, the blades 65 are configured to cut the paper in such a way as to provide one or more links 40 of paper extending between the adjacent visor cores 2. Similarly, the blades 65 also cut the paper 30 and 33 around the recess perimeter portions 74. As discussed above, the edge 46 of dividing wall 45 of lower tool 37 between cavities 43 and 44 pushes paper sheets 30, 33 into the lower surface 59 of upper tool 36 to thereby separate cavity 43 from cavity 44 and form a paper hinge 75 between the visor core halves 2A and 2B. As the paper sheets 30 and 33 are fed into the tool 35 (see also FIG. 4), a continuous chain 41 of visor cores 2 is thereby produced.

In the illustrated example, the chain of visor cores 2 is wrapped onto a spool or roll 32 and shipped to a remote location for further fabrication. The chain 41 is fed from the spool 32, and the holes 71 may be utilized to locate the cores 2 in the tooling for subsequent fabrication after removal from spool 32. During fabrication, the detent spring 6 and elbow 5 are placed in recess 61 (and 62 if required), and support pin 8 is positioned in the recesses 63. The links 40 between the adjacent visor cores 2 are cut to match the perimeter 73, and cover material 9 is pulled over the visor core halves 2A and 2B, and wrapped around the perimeter 73. Adhesive 24 is then applied to the paper 11A, 11B, and may also be applied around and adjacent the perimeter 73. The visor core halves 2A and 2B are then folded about the hinge 75 to bring paper 11A and 11B into contact to thereby form the visor.

In the illustrated example, the paper is trimmed around the visor core halves 2A and 2B by the blades 65 at substantially the same time the foam 48 is filling the cavity. In this way, the trimming operation and the foaming operation can both be accomplished at the same station. However, it will be readily apparent that the paper material could be trimmed to form the links 40 at a different station if required for a particular application. Also, in the illustrated example, chain 41 of visor cores is rolled onto a spool 32 for subsequent processing. However, it will be readily apparent that the additional fabrication steps can be conducted on the chain 41 of visor cores immediately following the foaming and trimming operations in tool 35. Also, in the illustrated example the visor core halves 2A and 2B are interconnected via an adhesive. The adhesive could be a wet glue, co-adhesive or other suitable adhesive. Furthermore, a wide variety of other methods of interconnecting the visor core halves could be utilized if required for a particular application.

In the illustrated example, sheets 30 and 33 forming the shell are paper. However, other suitable materials may also be utilized for the shell. Suitable materials are preferably somewhat porous and permit gas formed by curing foam 48 to escape through the sheets to thereby reduce or eliminate formation of cavities that could otherwise occur due to trapped gas. However, non-porous materials such as vinyl may also be utilized. Vacuum ports 76 may be utilized with porous or non-porous shell materials to facilitate venting of gas to prevent formation of voids. Also, the materials preferably provide sufficient sealing to prevent the foam 48 from seeping through the material into contact with the tool cavities 43, 44.

Figures 8, 9, 10:
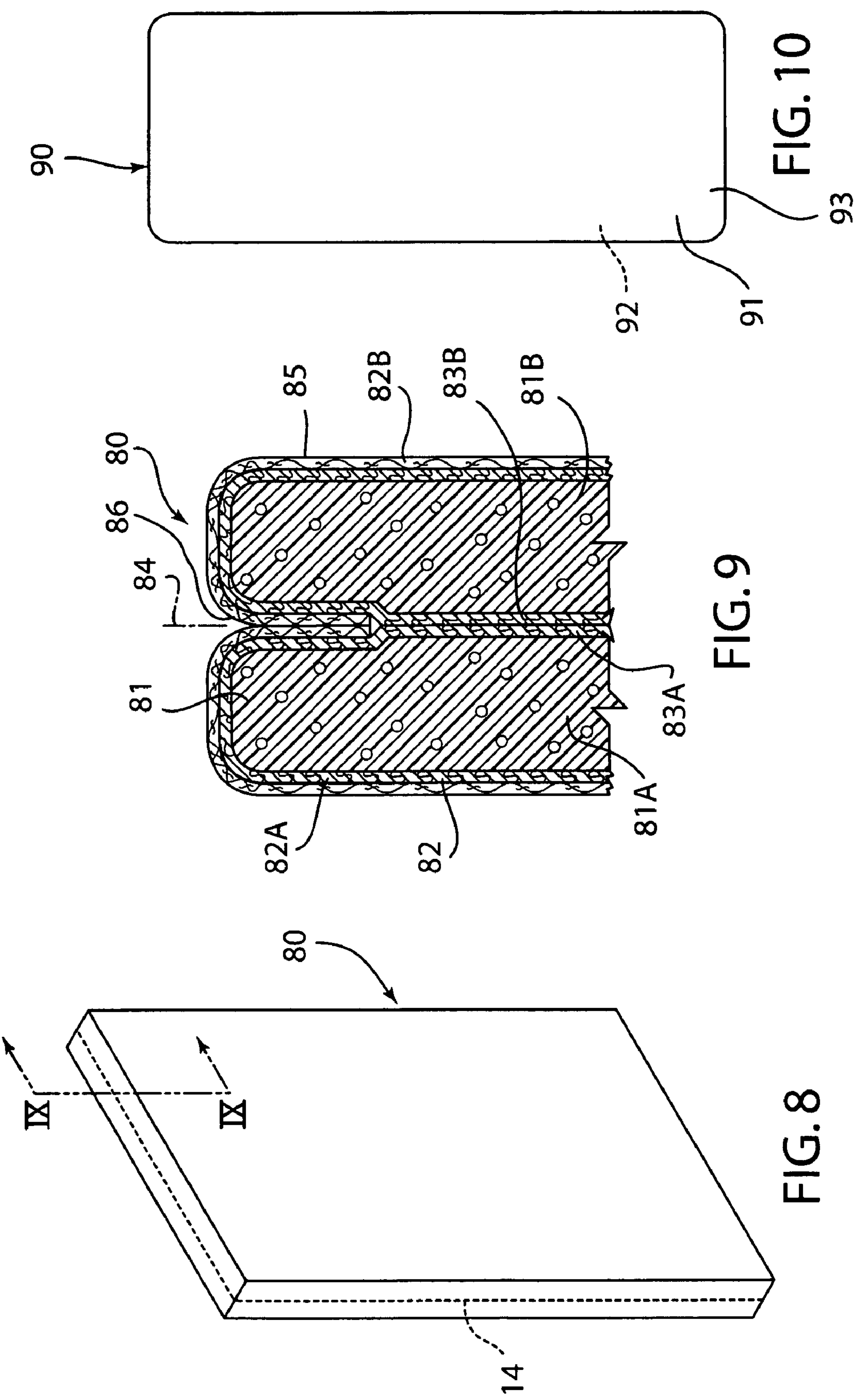
FIG. 8 is a perspective view of a panel for partitions, buildings, and the like according to another aspect of the present invention.
FIG. 9 is a cross-sectional view taken along the line IX-IX.
FIG. 10 is a plan view of a headliner for motor vehicles and the like according to another aspect of the present invention.

A variety of other products may also be fabricated utilizing the foam core and paper shell process described above. More specifically, with reference to FIG. 8, a panel 80 for covering building walls or office partitions and the like may also be fabricated utilizing substantially the same process as described in more detail above in connection with the visor 1. As illustrated in FIG. 9, foam core 81 may include core halves 81A and 81B, and an outer paper shell includes halves 82A and 82B that form a living hinge 14. Sheets of paper 83A and 83B are bonded to the foam core halves 81A and 81B, and are bonded to one another by adhesive along center plane 84. An outer cover made of fabric or the like is wrapped around the outer paper 82, and wrapped around to form a seam 86 in substantially the same manner as described above in connection with FIG. 3. Although the visor 1 and wall panel 80 have been described as having two halves that are folded together about a living hinge during assembly, it will be readily appreciated that parts that do not require convex surfaces on both sides (i.e., have one flat surface, or two parallel opposed flat surfaces) may be formed in a single mold cavity, without a living hinge 14 to provide a part having a paper covering without sheets of paper at the center plane of the part. For example, a single core half 81A could be utilized to form a panel.

With reference to FIG. 10, a headliner 90 for a vehicle or the like may also be fabricated utilizing the foam core and paper shell process described above. The headliner 90 includes a paper shell 91 and foam core 92 that are formed in substantially the same manner as described in detail above in connection with the visor 1, except that a living hinge is not utilized, such that headliner 90 has a construction substantially the same as either first half 2A or second half 2B of visor 1. Headliner 90 may be covered with a suitable fabric 93 or other cover material on one or both sides as required for a particular application.

Figure 11:
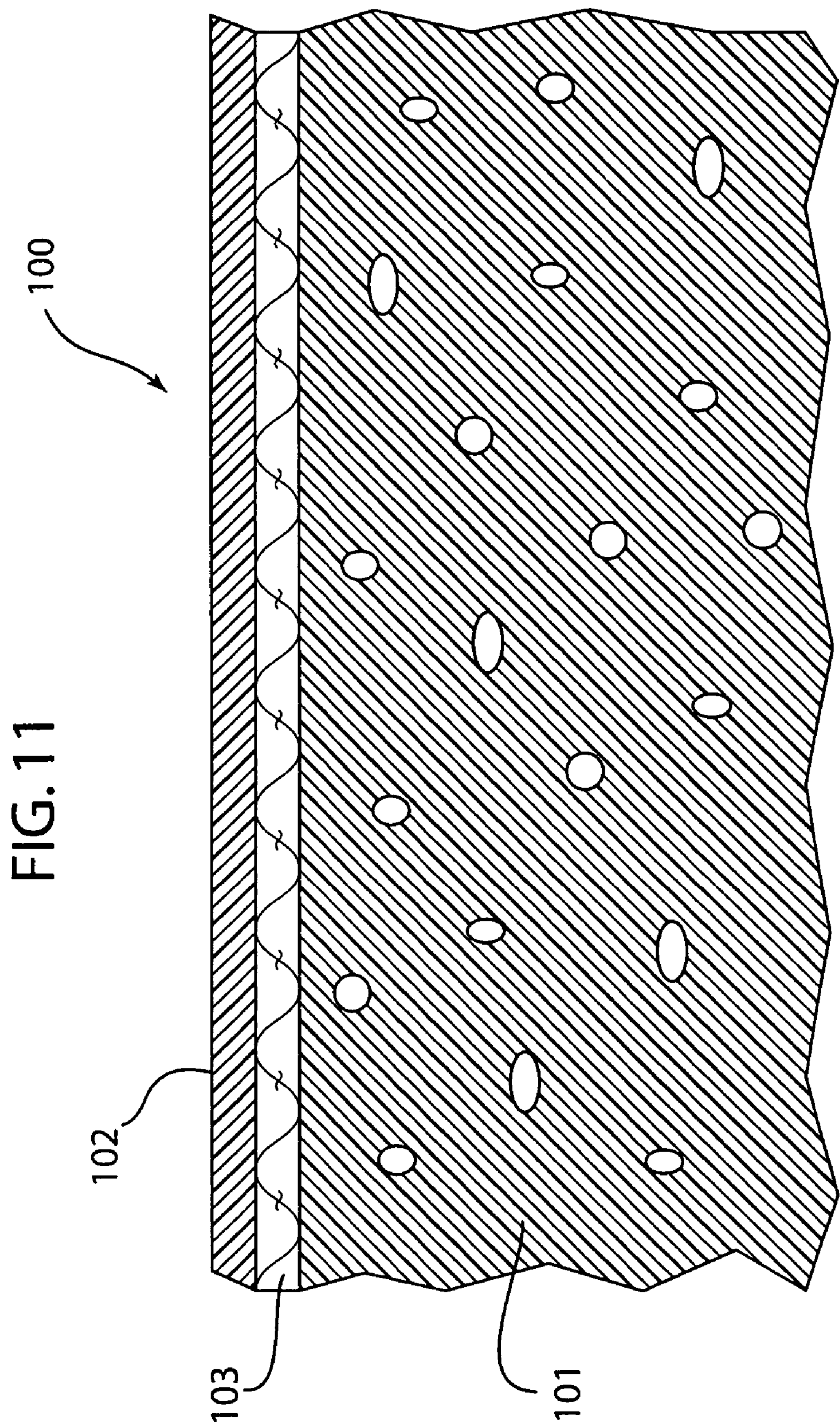
FIG. 11 is a fragmentary cross-sectional view of a visor or other part according to another aspect of the present invention.

With further reference to FIG. 11, a visor or other part 100 according to another aspect of the present invention includes a foam core 101, and a vinyl outer layer 102. A layer of porous scrim material 103 is bonded to the vinyl sheet 102. Scrim material 103 may be fiberglass or other suitable high temperature material. Two sheets of the vinyl material 102 are fed into a tool 35 in substantially the same manner as the sheets of paper 30 and 33 as described above in connection with FIGS. 4-6A. Two sheets of scrim material 103 are also fed into tool 35 (FIG. 4) between the sheets of vinyl material 102. As the foam 101 expands, it pushes the vinyl material 102 against the side walls 54, 55 of mold cavities 43 and 44, respectively. The foam 101 also pushes the scrim material 103 outwardly into the vinyl material 102. The foam 101 is absorbed in the scrim 103, and thereby bonds scrim 103 to the vinyl 102 when the foam 101 cures, and also bonds the foam core to the shell formed by vinyl 102 and scrim 103. Alternately, the sheet of scrim material 103 may be bonded to the vinyl 102 utilizing a conventional adhesive or the like prior to feeding the sheet of vinyl 102/scrim 103 into tool 35. The vinyl 102/scrim 103 also form a living hinge between the two halves of the part. The fiberglass scrim layer 103 provides a strong outer structural shell, thereby ensuring that part 100 has sufficient structural rigidity and strength. It will be understood that the part 100 may be a visor, wall panel, headliner, or other component.

According to another aspect of the present invention, a visor 1 or other part may also be fabricated utilizing a sheet or block of rigid thermoplastic foam. The foam material is formed to the required core shape utilizing a heated mold (not shown). The paper or vinyl shell may be positioned in the mold prior to forming of the foam such that the outer portion of the foam core bonds to the shell as it melts. Alternately, the shell (or fabric) may be adhesively bonded to the foam core after it is formed.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A visor for vehicles, comprising:

a paper shell having first and second halves having a shallow concave shape and defining a perimeter, wherein the first and second halves are folded about a hinge to define a cavity within the shell;

a rigid foam core filling at least a substantial portion of the cavity away from the perimeter and forming a foam inner core support, wherein the foam inner core support is bonded to the paper shell to provide structural support;

a structural mounting member extending from the paper shell for mounting the visor to the roof of a vehicle; and a cover made of a thin material extending over the paper shell.

2. A visor for vehicles, comprising:

a paper shell having first and second halves having a shallow concave shape and defining a perimeter, wherein the first and second halves are folded about a hinge to define a cavity within the shell;

a rigid foam core filling at least a substantial portion of the cavity, wherein the foam core is bonded to the paper shell to provide structural support, and wherein the foam core comprises two separate pieces of foam, each defining a substantially flat inner face;

a layer of paper bonded to each inner face, the layers adhesively bonded to each other;

a structural mounting member extending from the paper shell for mounting the visor to the roof of a vehicle; and a cover made of a thin material extending over the paper shell.

3. The visor of claim 1, wherein:

edge portions of the cover wrap inwardly around a portion of the perimeter of the first and second halves of the paper shell, with edge portions of the first and second halves contacting one another to form a tucked edge.

4. The visor of claim 3, including:

adhesive disposed around at least a portion of the tucked edge to secure the first half to the second half.

5. The visor of claim 3, wherein:

the visor defines a perimeter, the paper shell wrapping around first portions of the perimeter, and having first and second edges of the paper closely adjacent one another along second portions of the perimeter.

6. The visor of claim 1, wherein: the cover comprises a woven fabric material.

7. The visor of claim 1, wherein:

the cover comprises a polymer material.

8. The visor of claim 1, wherein:

the inner core support comprises a polyurethane foam.

9. The visor of claim 8, wherein:

the inner core support defines an internal cavity; and including:

a detent spring disposed in the cavity and operably coupled to the structural mounting member to provide controlled rotation of the visor about the structural mounting member.

10. A visor for vehicles, comprising:

a thin flexible paper shell having first and second halves having a shallow concave shape and defining a perimeter, wherein the first and second halves are folded about a hinge to define a cavity within the shell, the paper shell comprising a layer of paper that can be readily deformed;

a rigid foam core filling at least a substantial portion of the cavity away from the perimeter and forming a foam inner core support, wherein the foam inner core support is bonded to substantially the entire inner surface of the paper shell to provide structural support, wherein the thin flexible paper is sufficiently flexible so as to require support from the foam core to retain its shape;

a structural mounting member extending from the paper shell for mounting the visor to the roof of a vehicle; and a cover made of a thin material extending over the paper shell.

11. The visor of claim 10, wherein:

the paper shell comprises a porous material.

12. The visor of claim 10, wherein:

the foam core comprises first and second discrete halves positioned in the first and second halves, respectively, of the paper shell, each half of the foam core having an outer side with an outer surface in contact with the paper shell, and an opposite inner side with an inner surface.

13. A visor for vehicles, comprising:

a thin flexible paper shell having first and second halves having a shallow concave shape and defining a perimeter, wherein the first and second halves are folded about a hinge to define a cavity within the shell, the paper shell comprising a layer of paper that can be readily deformed;

a rigid foam core filling at least a substantial portion of the cavity away from the perimeter and forming a foam inner core support, wherein the foam inner core support is bonded to substantially the entire inner surface of the paper shell to provide structural support, wherein the thin flexible paper is sufficiently flexible so as to require support from the foam core to retain its shape;

a structural mounting member extending from the paper shell for mounting the visor to the roof of a vehicle; and a cover made of a thin material extending over the paper shell;

the foam core comprises first and second discrete halves positioned in the first and second halves, respectively, of the paper shell, each half of the foam core having an outer side with an outer surface in contact with the paper shell, and an opposite inner side with an inner surface; and wherein:

the visor includes at least one layer of material extending between the first and second halves of the foam core.

14. The visor of claim 13 wherein:

the one layer of material comprises paper.

15. A visor for vehicles, comprising:

a paper shell having first and second halves having a shallow concave shape and defining a perimeter, wherein the first and second halves are folded about a hinge to define a cavity within the shell, the shell comprising a porous paper material;

a rigid foam core filling at least a substantial portion of the cavity away from the perimeter and forming a foam inner core support, wherein the foam inner core support is bonded to the paper shell to provide structural support;

a structural mounting member extending from the paper shell for mounting the visor to the roof of a vehicle; and a cover made of a thin material extending over the paper shell.

16. The visor of claim 15, wherein:

the foam core comprises first and second discrete halves positioned in the first and second halves, respectively, of the paper shell, each half of the foam core having an outer side with an outer surface in contact with the paper shell, and an opposite inner side with an inner surface.

17. A visor for vehicles, comprising:

a paper shell having first and second halves having a shallow concave shape and defining a perimeter, wherein the first and second halves are folded about a hinge to define a cavity within the shell, the shell comprising a porous paper material;

a rigid foam core filling at least a substantial portion of the cavity away from the perimeter and forming a foam inner core support, wherein the foam inner core support is bonded to the paper shell to provide structural support;

a structural mounting member extending from the paper shell for mounting the visor to the roof of a vehicle; and a cover made of a thin material extending over the paper shell;

the foam core comprises first and second discrete halves positioned in the first and second halves, respectively, of the paper shell, each half of the foam core having an outer side with an outer surface in contact with the paper shell, and an opposite inner side with an inner surface; and wherein:

the visor includes at least one layer of material extending between the first and second halves of the foam core.

18. The visor of claim 17 wherein:

the one layer of material comprises paper.

19. A visor for vehicles, comprising:

a paper shell having first and second parts having a shallow concave shape and defining a perimeter, wherein the first and second parts are folded about a hinge to define a cavity within the shell;

a rigid foam core filling at least a substantial portion of the cavity, wherein the foam core is bonded to the paper shell to provide structural support, and wherein the foam core comprises two separate pieces of foam, each defining a substantially flat inner face;

at least one layer of material disposed between the inner faces of the pieces of foam;

a structural mounting member extending from the paper shell for mounting the visor to the roof of a vehicle.

20. The visor of claim 19, wherein:

the one layer of material comprises paper that is bonded to the inner face of a selected one of the pieces of foam.

21. The visor of claim 20, including:

a second layer of paper bonded to the inner face of the other of the pieces of foam.

22. The visor of claim 19, wherein:

the first and second parts are mirror-images of one another.

23. A visor for vehicles, comprising:

a shell comprising paper and having first and second parts having a shallow concave shape and defining a perimeter, wherein the first and second parts are folded about a hinge to define a cavity within the shell;

a rigid foam core filling at least a substantial portion of the cavity away from the perimeter and forming a foam inner core support, wherein the foam inner core support is bonded to the shell to provide structural support;

a structural mounting member extending from the shell for mounting the visor to the roof of a vehicle.

24. The visor of claim 23, wherein:

the shell comprises an outer of material covering the layer of paper.

* * * * *

UNITED STATES PATENT AND TRADEMARK OFFICE
CERTIFICATE OF CORRECTION

PATENT NO. : 7,416,239 B2
APPLICATION NO. : 11/029590
DATED : August 26, 2008
INVENTOR(S) : Michael L. Lanser, Steven T. Dyk and David L. Hiemstra It is certified that error appears in the above-identified patent and that said Letters Patent is hereby corrected as shown below:

Claim 24, Col. 10, line 27;

after “outer” delete “of”.

Signed and Sealed this

Eighth Day of September, 2009

David J. Kappos
*Director of the United States Patent and Trademark Office*